No. 716,965. Patented Dec. 30, 1902.
F. VON VELTHEIM-OSTRAU.
DEVICE FOR CUTTING OFF THE HEADS OF TURNIPS.
(Application filed Aug. 12, 1901.)
(No Model.) 2 Sheets—Sheet 1.

Witnesses

Inventor
Franz von Veltheim-Ostrau
by his Attorney

No. 716,965. Patented Dec. 30, 1902.
F. VON VELTHEIM-OSTRAU.
DEVICE FOR CUTTING OFF THE HEADS OF TURNIPS.
(Application filed Aug. 12, 1901.)
(No Model.) 2 Sheets—Sheet 2.
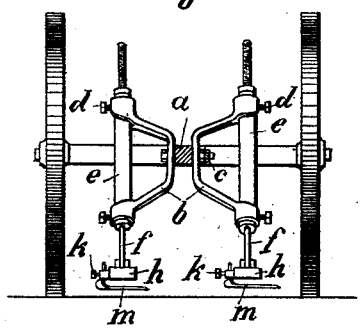
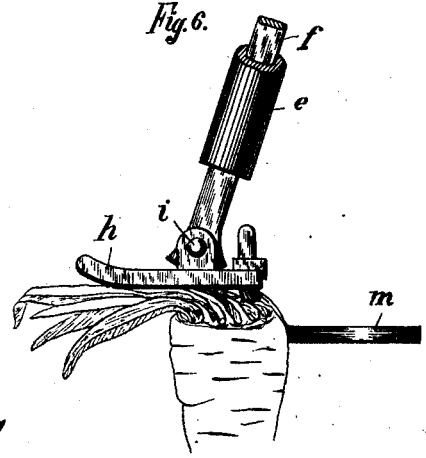
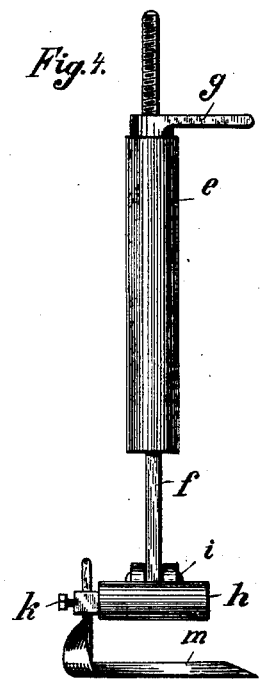
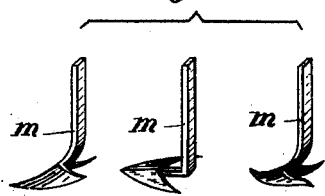
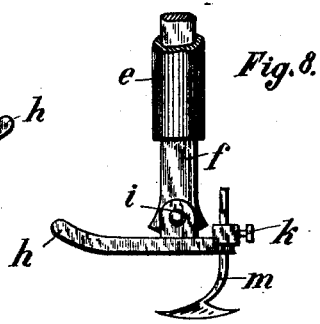

UNITED STATES PATENT OFFICE.

FRANZ VON VELTHEIM-OSTRAU, OF KREIS BITTERFELD, GERMANY.

DEVICE FOR CUTTING OFF THE HEADS OF TURNIPS.

SPECIFICATION forming part of Letters Patent No. 716,965, dated December 30, 1902.

Application filed August 12, 1901. Serial No. 71,783. (No model.)

*To all whom it may concern:*

Be it known that I, FRANZ VON VELTHEIM-OSTRAU, a subject of the Emperor of Germany, residing and having my post-office address at Schloss Ostrau, Kreis Bitterfeld, Germany, have invented a certain new and useful Improved Device for Cutting Off the Heads of Turnips, of which the following is a specification.

The present invention relates to a device adapted to be easily attached to any mobile agricultural implement; and the purpose thereof is to cut off the tops or heads of turnips, beet-roots, and the like before the latter are dug, and with slight modifications to be directly used for removing weeds growing between rows of turnips or the like and for loosening the soil between such rows.

The main feature of the invention lies in the fact that the cutter not only adapts itself to irregularities of the soil, but also removes the heads of the turnips or the like at an always uniform height to whatever extent the root projects from the soil.

The device comprises a guide or the like attached to a mobile agricultural implement at an angle of about eighty degrees to the ground, in which guide a rod, with an adjustable head, is loosely suspended, the lower end of the said rod being movably connected with a sliding shoe which slides along the ground and on ascending an elevation or the like simply raises the rod. When the shoe encounters a turnip or the like, it first swings forward on its pivot, then slides up the turnip, and in doing so it adjusts itself by reason of its revoluble connection with the rod to the shape of the turnip or the height of the head of the latter, and in advancing farther falls back into the horizontal position, after which an adjustable knife attached to its rear part cuts off the head of the turnip or the like.

One form of construction of the device is represented in the annexed drawings attached to a mobile agricultural implement such as is commonly used for digging turnips and the like. The plowshares used for this purpose are, however, not represented, to render the drawings more comprehensible.

Figure 1:
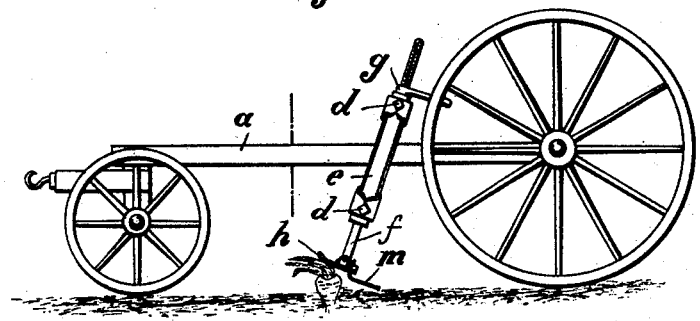
Figure 2:
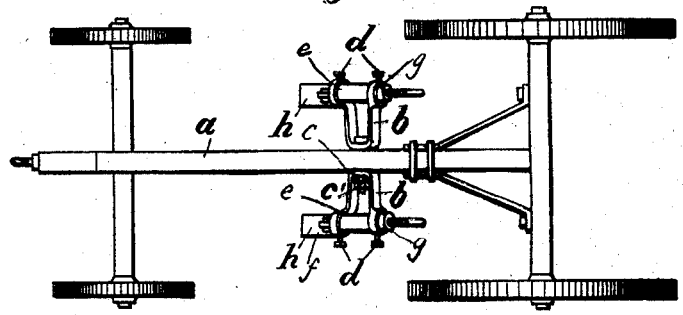

Figure 1 represents an elevation of the whole of the apparatus at the moment in which the sliding shoe meets a turnip. Fig. 2 represents a plan view of Fig. 1, and Fig. 3 a front view of the new device. Fig. 4 represents a front view, and Fig. 5 a side view, partially in section, of the actual cutter. Fig. 6 shows the latter in its working position with the knife ready to cut. Fig. 7 represents various forms of knife used for removing weeds or for loosening the soil, and Fig. 8 shows the method of attaching said knife to the sliding shoe in place of the cutter.

In the form of construction represented two cutters are adjustably fastened, by means of wrought-iron supports $b$, to the beam $a$ of the implement in the required inclined position. When the fastening-nut $c'$ has been loosened, the supports $b$ can be revolved on the screw $c$, and the cutters thus inclined more or less to the earth. When the attachment-screws $d$ have been loosened, the guides $e$ of the cutters can also be moved up or down on the support $b$. Loosely suspended from each guide $e$ is a rod $f$, which is prevented from falling out by an adjustable abutment $g$. To the lower end of the rod $f$ a sliding shoe $h$ is pivoted by means of a pin $i$, and to the rear end of said shoe the cutting-knife $m$ is adjustably fastened by means of the attachment-screw $k$.

The action of the device is as follows: The abutment $g$ is adjusted in such a manner that the shoe $h$ or the knife $m$, fastened thereto, almost touches the ground. When the shoe $h$ meets an elevation of the ground, it ascends said elevation and descends on the other side, so that the device thus adapts itself to unevennesses of the soil. When the shoe meets a turnip or the like, it first revolves on its pivot, as shown in Fig. 1, and at the same time forces over the head of the turnip in a forward direction. On advancing farther the shoe again assumes a horizontal position, and in doing so raises the knife $m$ at its rear, and the latter cuts off the head of the turnip with only a small portion of the top. The knife $m$ is bent in such a manner that it throws the head cut off forward and to the side, and the weight of the shoe $h$ is so calculated and distributed that in its resting position it will be horizontal, or approximately so, notwithstanding the weight of the knife at its rear.

Any suitable number of cutters can be attached to one mobile implement. It is only necessary to arrange the cutters at distances apart equal to the distances between the rows of turnips or the like.

The foregoing description will render it obvious that the device can be used for removing weeds or for loosening the soil between the planted rows of turnips, potatoes, or the like. For this purpose it is sufficient to replace the knife $m$ by a differently-shaped knife, (a so-called "cultivation-knife," as shown in Fig. 7.) This knife is attached to the sliding shoe in the manner shown in Fig. 8. The fact that the shoe passes over all irregularities of the ground has the effect that the knife does not bore into the ground, but loosens the surface of the soil to an always uniform depth and removes the weeds. If a considerable number of the cutters described are attached to a broad implement, a weed-knife of different size or shape (see Fig. 7) can be fixed to each shoe.

What I claim is, in a device of the character indicated—

1. The combination of a guide, a rod suspended in said guide and adapted to move longitudinally therein, a sliding shoe revolubly attached to the lower end of said rod, and a knife attached to the rear end of said shoe, substantially as described.

2. The combination of a guide, a rod suspended in said guide and adapted to move longitudinally therein, an adjustable abutment on said rod, a sliding shoe revolubly attached to the lower end of said rod, and a knife adjustably attached to the rear end of said shoe, substantially as described.

3. The combination with a mobile agricultural implement of one or more cutting devices adjustably mounted thereon in an inclined position, each of said cutting devices consisting of a guide, a longitudinally-adjustable rod suspended in said guide, an adjustable abutment on said rod, a sliding shoe revolubly attached to the lower end of said rod, and a knife adjustably attached to the rear end of said shoe, substantially as described.

4. The combination with a mobile agricultural implement of one or more cutting devices adjustably mounted thereon in an inclined position, each of said cutting devices consisting of a guide, a longitudinally-adjustable rod suspended in said guide, an adjustable abutment on said rod, a sliding shoe revolubly attached to the lower end of said rod, and a knife adjustably attached to the rear end of said shoe, substantially as described.

In witness whereof I have signed this specification in the presence of two witnesses.

FRANZ VON VELTHEIM-OSTRAU.

Witnesses:
B. H. WARNER, Jr.,
RUDOLPH FRICKE.